June 11, 1963   A. SMITH ETAL   3,093,268
FERTILIZER DISTRIBUTOR
Filed March 13, 1959   4 Sheets-Sheet 1

INVENTORS
Alexander Smith
B. D. Baggs Jr.
BY
A. Yates Dowell
ATTORNEY

June 11, 1963 A. SMITH ET AL 3,093,268
FERTILIZER DISTRIBUTOR
Filed March 13, 1959 4 Sheets-Sheet 2

INVENTORS
Alexander Smith
B.D. Baggs Jr.
BY
ATTORNEY

June 11, 1963   A. SMITH ETAL   3,093,268
FERTILIZER DISTRIBUTOR
Filed March 13, 1959   4 Sheets-Sheet 3

INVENTORS
Alexander Smith
B. D. Baggs, Jr.
BY
ATTORNEY

June 11, 1963  A. SMITH ETAL  3,093,268
FERTILIZER DISTRIBUTOR
Filed March 13, 1959  4 Sheets-Sheet 4

INVENTORS
Alexander Smith
B. D. Bagg, Jr.
BY
N. Yates Dowell
ATTORNEY

United States Patent Office 3,093,268
Patented June 11, 1963

3,093,268
FERTILIZER DISTRIBUTOR
Alexander Smith, Box 1460, and Burton D. Baggs, Jr.,
2429 Laurel Ave., both of Sanford, Fla.
Filed Mar. 13, 1959, Ser. No. 799,359
6 Claims. (Cl. 222—167)

This invention relates to the cultivation of the soil including the application of substances which affect the latter and to equipment employed in the treatment of the soil to promote the growth and development of plant life and the fruits thereof.

The invention relates specifically to the distribution of matter to promote growth, maturity and longevity of plant life and to the equipment by which pulverulent material may be discharged onto the soil to be integrated therewith or dusted onto such plant life.

Fertilizer distributors of many kinds and operated in many ways are old and well known. They have been criticized as being complicated, expensive, and failing to satisfactorily serve the purpose for which they were created.

It is an object of the invention to provide a fertilizer distributor of simple and inexpensive construction in which a variable measured amount of fertilizer is introduced into an air stream and discharged directly onto growing plants or onto the earth so that it may be mixed therewith.

Another object of the invention is to provide a fertilizer distributor in which either the exhaust of an internal combustion engine or fluid pressure from a pump or other source is utilized for discharging fertilizer from an airtight container in a measured amount which can be varied with substantially no obstruction of air flow which would create substantial back pressure.

Another object of the invention is to provide a fertilizer distributor in the form of a rotatable air-tight cylinder or drum which can be mounted on a vehicle or allowed to roll on the earth and with such cylinder or drum having means therein for elevating the fertilizer so it may drop by gravity into a discharge line and with a control for the amount of fertilizer received and discharged to allow variation thereof.

Figure 1:
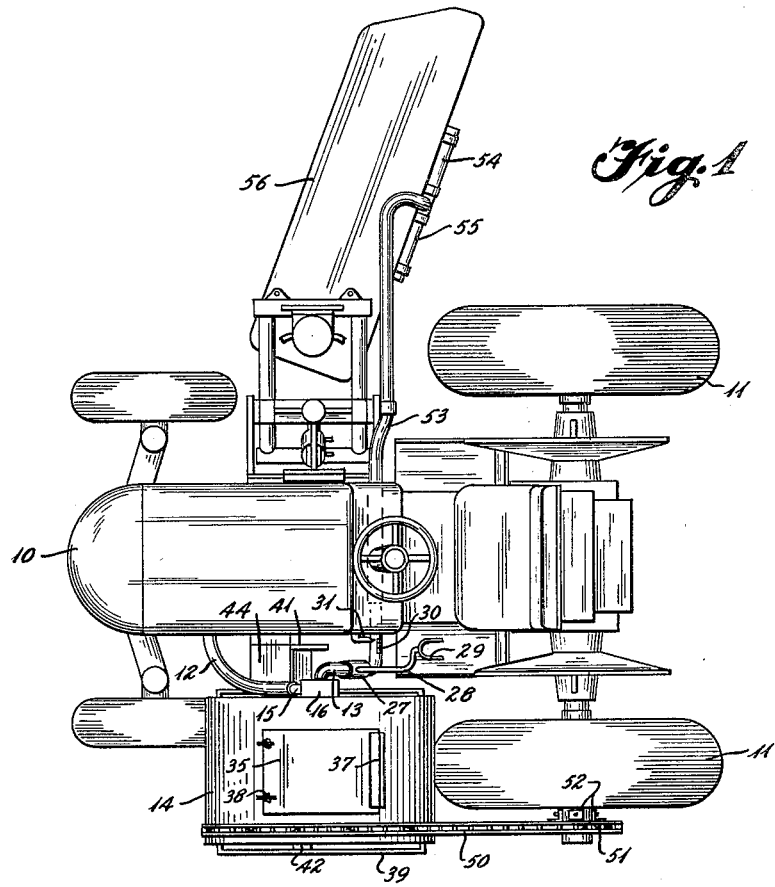
Figure 2:
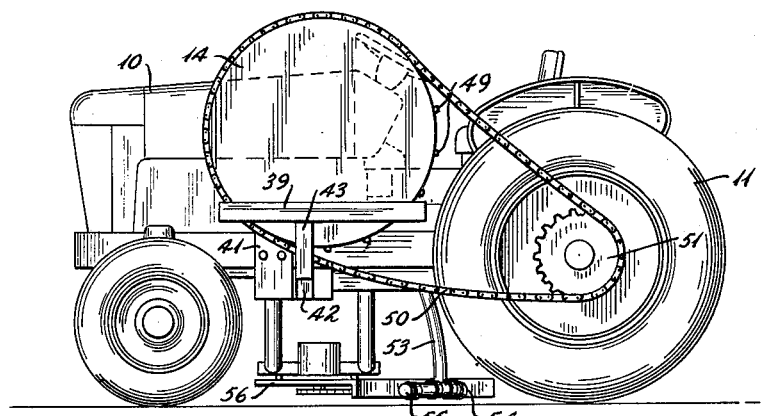
Figure 3:
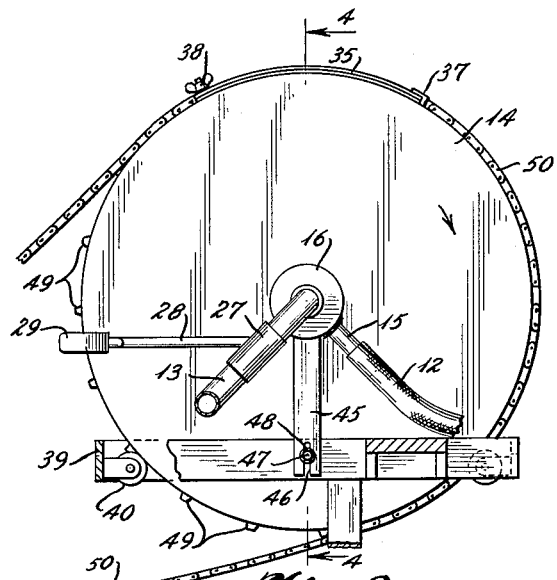
Figure 4:
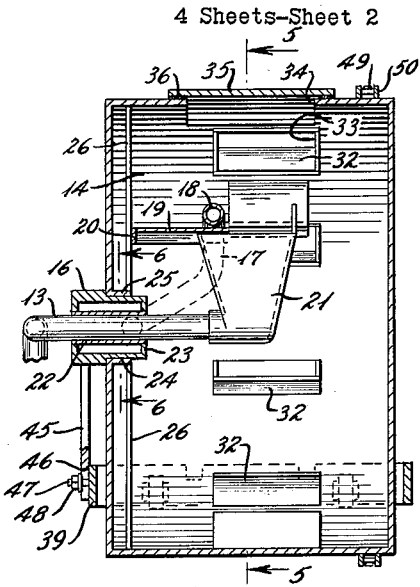
Figure 5:
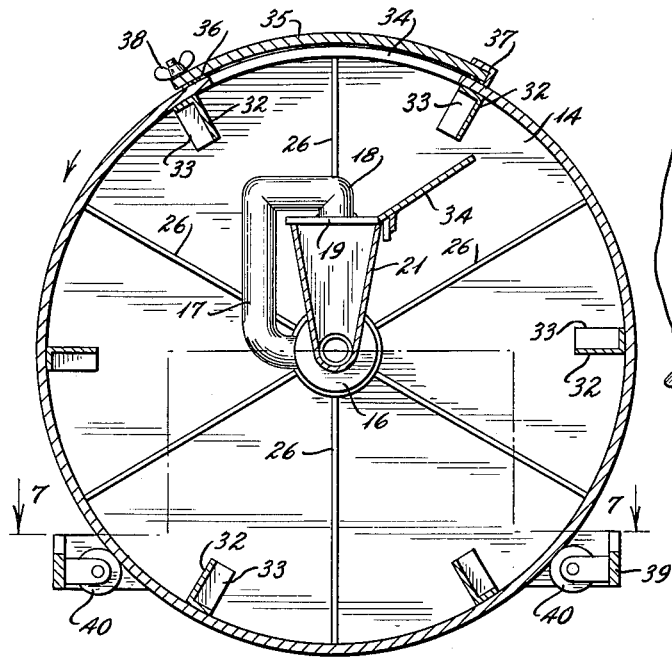
Figure 6:
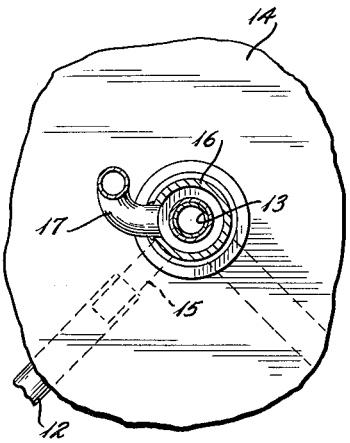
Figure 7:
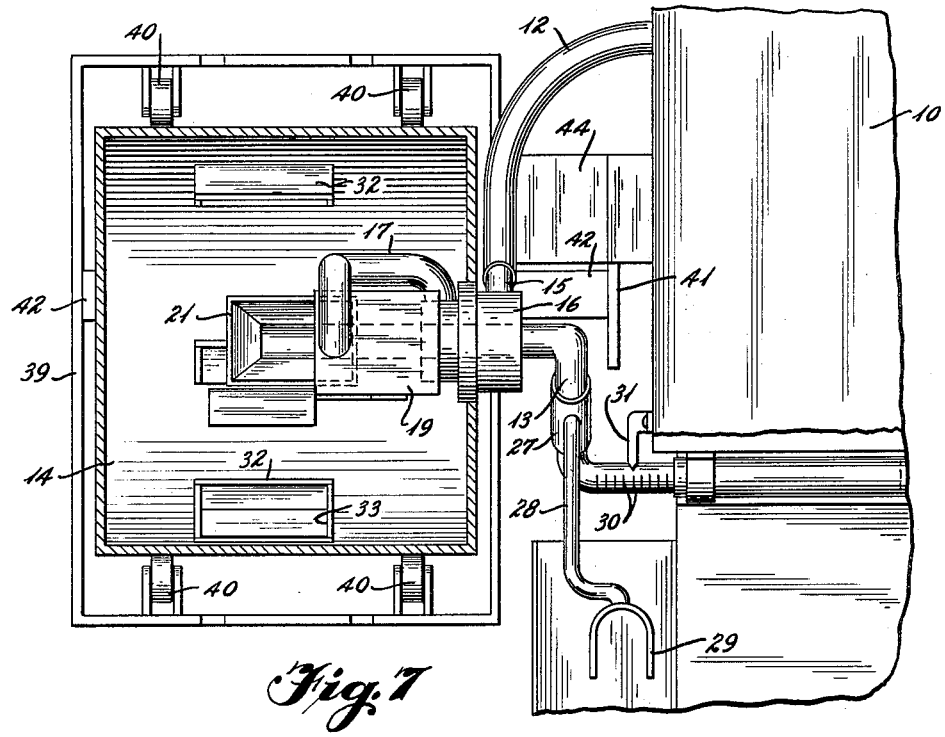
Figure 8:
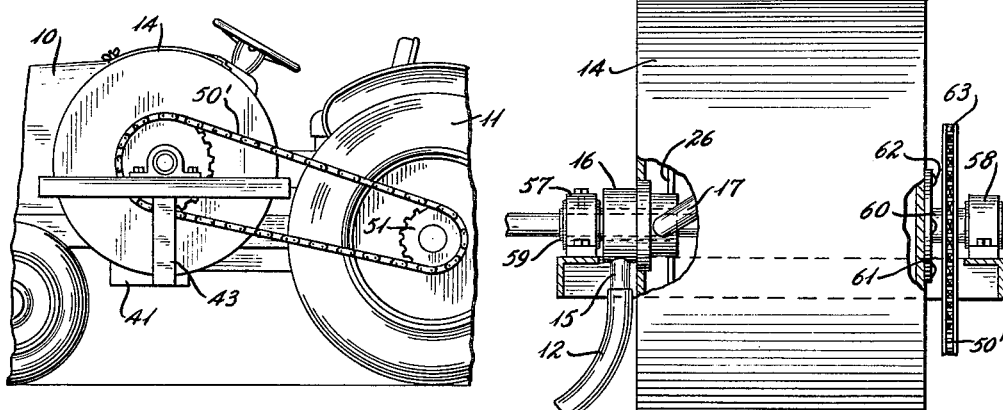
Figure 9:
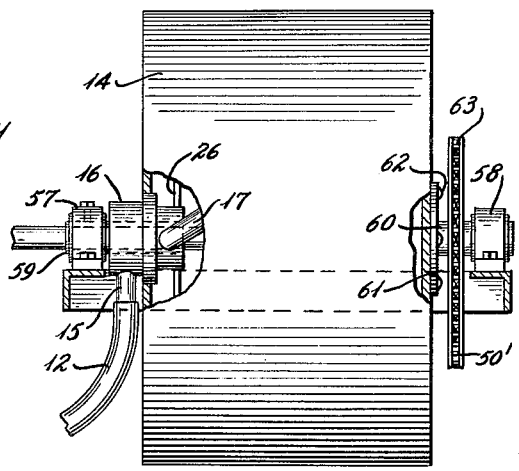
Figure 10:
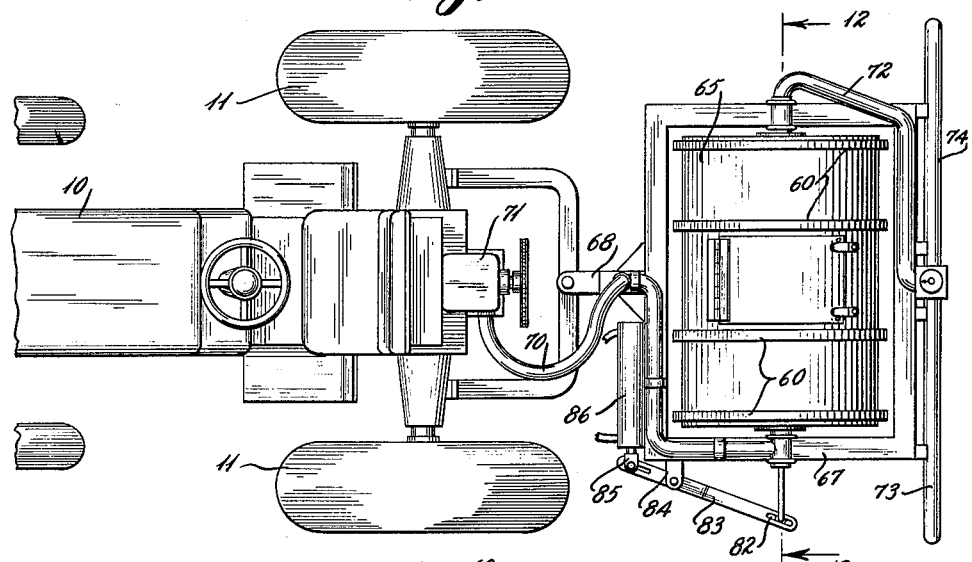
Figure 11:
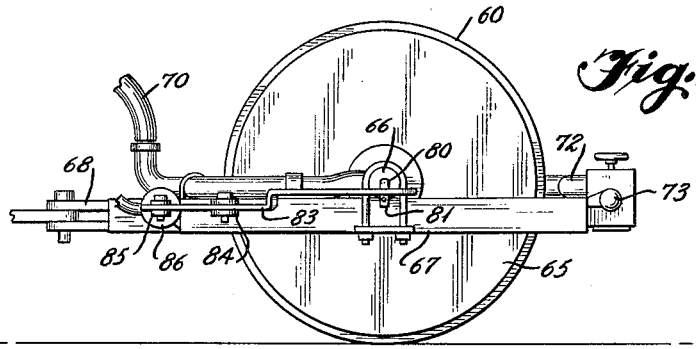
Figures 12, 13:
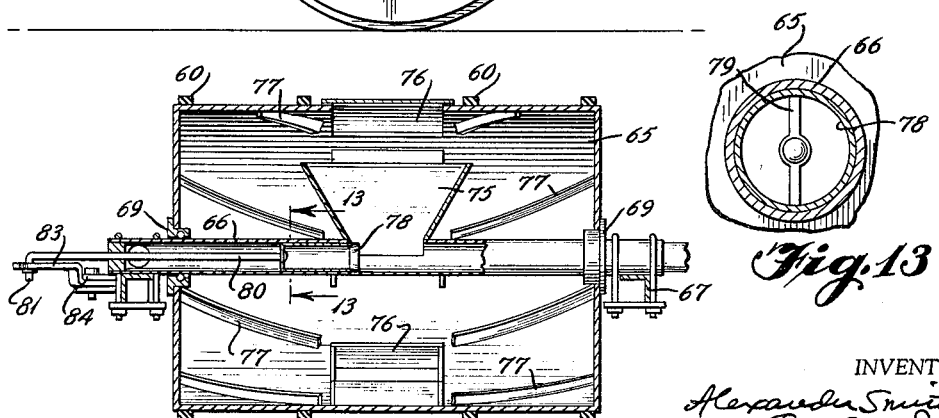

Other objects and advantages of the invention will be apparent from the following description taken in conjunction with the accompanying drawings, wherein:

FIG. 1 is a top plan view illustrating one application of the invention mounted on a tractor;

FIG. 2, a side elevation thereof;

FIG. 3, a side elevation of the opposite side of the distributor cylinder or drum;

FIG. 4, a vertical axial section through the distributor cylinder or drum on the line 4—4 of FIG. 3;

FIG. 5, a vertical diametrical section on the line 5—5 of FIG. 4;

FIG. 6, a fragmentary detail section on the line 6—6 of FIG. 4;

FIG. 7, a section taken on the line 7—7 of FIG. 5;

FIG. 8, a side elevation of a tractor illustrating a modified form;

FIG. 9, a front elevation of the modified form shown in FIG. 8;

FIG. 10, a top plan view of a modified form of distributor or dispenser of pulverulent material adapted to be hooked onto a trailer or propelling vehicle;

FIG. 11, a side elevation of the modification shown in FIG. 10;

FIG. 12, a section on the line 12—12 of FIG. 10; and

FIG. 13, a section on the line 13—13 of FIG. 12.

Briefly stated, the distributor or dispenser of the present invention comprises a cylinder or drum for containing the material to be distributed or dispensed, such cylinder or drum being mounted on a horizontal axis and with a fluid line extending into said cylinder or drum and having means for introducing the material to be dispensed in the amount desired into said fluid line and having a discharge line terminating exteriorly of the cylinder or drum in the desired location, and with fluid means for discharging the fertilizer by fluid pressure from such cylinder or drum and with a visible gauge on the exterior of the cylinder or drum so that the operator may determine the amount of the material dispensed and vary such amount if desired.

With continued reference to the drawings, the distributor of the present invention is adapted to dispense fertilizer by fluid pressure and may be applied to a tractor 10 having rear wheels 11 driven by an internal combustion engine, to the exhaust of which engine a line 12 is connected for providing the force necessary for discharging fertilizer or pulverulent or other relatively fine material through a discharge tube 13 from a cylinder or drum 14. The line 12 is connected to a nipple 15 which leads into and is fixed to a sleeve 16, the opposite end of such sleeve having an outlet to which a pipe 17 with a downwardly turned extremity 18 is attached so that the exhaust supplied into the cylinder or drum 14 may be directed downwardly from such extremity 18.

A closure plate 19 is attached to the pipe 17 and its downwardly directed extremity 18, such closure plate having a depending end 20 which forms a stop for a slidable hopper 21. The sides of the hopper 21 converge inwardly from top to bottom and connect to the discharge pipe 13 so that the exhaust admitted through the line 12, nipple 15, sleeve 16, and pipe 17 will, by pressure within the cylinder or drum, force discharge through the pipe 13 which is slidable within a bearing sleeve 22 carried by the ends 23 of the tube 16.

The drum has an opening 24 in which the sleeve 16 is disposed and about the sleeve 16 is fixed a hub 25 with radial supporting spokes 26 of any desired number, six being used for purposes of illustration. These spokes engage the cylindrical wall of the cylinder or drum. The discharge tube 13 is axially slidable so that when it is moved, the hopper will move relative to the closure plate 19 to control the opening in the upper end of the hopper 21 and determine the amount of fertilizer fed into the hopper.

In order to cause the discharge tube 13 to move axially, a collar 27 is attached to the discharge tube 13 exteriorly of the drum. A rod 28 is provided having one end attached to the collar 27 by welding or other means and the other end of such rod supports a yoke 29 adapted to be engaged by the leg or knee of the tractor operator. A series of score lines 30 or other position indicating means are applied to the movable discharge tube 13 and an indicator 31 is fixed to the tractor so that the operator can govern the amount of fertilizer discharged by the mere movement of his leg.

In order to supply fertilizer or other material to the hopper, the cylindrical wall of the drum 14 is provided with a plurality of buckets composed of angle members 32 with end plates 33. As the cylinder rotates, these buckets carry the material from the lower portion of the cylinder upwardly where it drops by gravity onto an inclined feed plate 34 on one side of the hopper 21 and the pressure within the line 12 will force it out the tube 13.

The drum may have an opening 34 and a cover 35 with a sealing gasket 36 for forming a tight joint when the cover 35 is in place. One end of the cover seats beneath a flange 37 and the other end is secured in place by bolts and wing nuts 38. This affords means by which the drum can be supplied with the material to be distributed as well as access to the parts within the drum.

The drum 14 is supported by a rectangular frame 39 having two pairs of spaced opposed rollers 40, and with the spacing of the pairs less than the diameter of the drum so that the convex surface of the drum will rest upon such rollers. The rectangular frame 39 is provided with a relatively wide depending mounting plate 41 adapted to be fixed to the tractor and with an arm 42 which extends outwardly and forms a support for a depending bracket 43 from the opposite side of the frame. The mounting plate 41 has its upper end provided with an outwardly turned portion 44 so that the frame will be spaced laterally of the tractor. Thus, the cylinder or drum may be placed in the frame where it will be retained by an adjustable mounting bar 45 having a slot 46 in one end thereof for the reception of a bolt 47 whereby the bar 45 may be fixed to the frame 39 by nut 48 in such a manner that the drum can rotate on the two pairs of opposed rollers 40. Means is provided for rotating the cylinder or drum comprising projections 49 spaced around the exterior of the cylinder to form sprocket teeth for engagement by a chain 50 driven by a sprocket 51 attached to the rear wheel 11 by means of brackets 52.

The discharge tube 13 may have a hose 53 connected thereto and extended to a remote position of discharge and if desired may terminate in diverging discharge extremities 54 and 55. The discharge for example, may be adjacent a cutter bar 56 having cutters (not shown) for cutting growth or working the soil.

Instead of the cylinder or drum 14 being supported by rollers 40, the frame 39 may be provided with bearings 57 and 58 (FIGS. 8 and 9). The bearing 57 may have a sleeve 59 through which the discharge pipe 13 is axially slidable and bearing 58 is adapted to rotatably receive a shaft 60 attached to the drum 14 by a flange 61 and fasteners 62. If it is desired to rotate the drum faster, a suitable sprocket 63 may be mounted on the shaft 60 and driven by a chain 50' from the sprocket 51 on the rear wheel 11.

Instead of the cylinder or drum 14 which is tractor mounted, a cylinder or drum 65 (FIGS. 10–13) may be employed having a central axis forming tube 66 to the ends of which is connected a draft yoke 67 having a front end connection 68 for attachment to a tractor or other propelling vehicle. The axis forming tube 66 is provided with bearings 69 on which the cylinder 65 can rotate. A hose 70 is supplied for admitting the exhaust or air from a pump 71 into one end of the tube 66. As in the previous embodiments, fluid under pressure is admitted into the cylinder 65 through the hose 70 and fertilizer is discharged through the tube 66 and a discharge tube 72 having diverging ends 73 and 74 disposed in any desired location.

The cylinder or drum 65 may be somewhat longer than the cylinder 14 and a hopper 75 may be mounted centrally of the drum 65 on the tube 66. The drum is provided with a plurality of buckets 76 to raise the fertilizer from the lower portion of the drum and to deposit the same into the hopper. In order to cause the fertilizer in the drum to move to the center portion thereof so that the buckets may pick it up, a pair of upwardly and outwardly diverging blades 77 are mounted on the cylindrical wall adjacent each of the buckets 76 in a manner that when the drum is rotated, the fertilizer will move by gravity down the blades toward the buckets.

The rate of discharge from the drum is controlled by a tubular valve member 78 which is slidable axially along the interior of the tube 66 to open or close the bottom of the hopper 75 and regulate the amount of fertilizer which is admitted into the tube 66 for discharge therefrom. The valve 78 is provided at one end with a cross member 79 to which is attached one end of an actuating rod 80. The opposite end of the actuating rod 80 has a downwardly projecting portion 81 which slidably engages a slot 82 in one end of a toggle bar 83 and such toggle bar is pivotally mounted to a pair of lugs 84 projecting from the yoke 67. The opposite end of the toggle bar 83 is pivotally mounted on a piston 85 operated by a cylinder 86 to move the valve 78.

The cylinder 65 rolls on the earth and preferably is provided with two pairs of annular resilient tread-forming rings 87 to prevent injury to the cylinder or drum when the device is being transported over pavement.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A fertilizer distributor comprising a cylinder having an opening for the introduction of material to be discharged, means for rotating said cylinder about a horizontal axis, a hopper carried within said cylinder, a series of buckets around the inner periphery of said cylinder for elevating said material and permitting it to fall by gravity into said hopper, concentric sleeves through one end of said cylinder, an internal tube extending upwardly from the outer of said sleeves and having its upper end provided with a goose-neck discharging downwardly into said hopper, a closure member attached to said gooseneck, a second tube extending from the lower end of said hopper through the inner of said concentric sleeves, said hopper and said closure member being movable relative to each other to determine the amount of opening in the top of the hopper in which is received material falling from said buckets by gravity, and means for connecting said outer sleeve to a source of pressurized fluid.

2. A fertilizer distributor comprising a cylinder, means for rotating said cylinder about a horizontal axis, a hopper carried within said cylinder, a series of radial projections around the inner periphery of said cylinder for elevating the fertilizer and permitting it to fall by gravity into said hopper, a sleeve concentric with the horizontal axis through one end of said cylinder for the admission of pressurized fluid, an axial bearing located within said sleeve and spaced therefrom, a closure member mounted within said cylinder in proximity to said hopper, a tube connecting said sleeve and said closure member, a second tube extending from the lower end of said hopper and through said bearing, said hopper and said closure member being movable relative to each other to determine the amount of opening into said hopper for receiving the fertilizer falling by gravity.

3. The structure of claim 2 including means for connecting said sleeve to a source of pressurized fluid.

4. The structure of claim 2 including means for connecting said second tube to a fertilizer discharge.

5. The structure of claim 2 including means for adjusting the relative positions of said closure member and said hopper while said distributor is operating.

6. A fertilizer distributor comprising a hollow cylinder, means for introducing fertilizer into said cylinder, means for rotating said cylinder substantially on a horizontal axis, means around the inner periphery of said cylinder for elevating the fertilizer and permitting it to fall by gravity into a hopper carried within said cylinder, a closure member mounted within said cylinder in proximity to said hopper, said closure member and said hopper being movable relative to each other and selectively controlled exteriorly of the cylinder to regulate the opening into said hopper to determine the amount of fertilizer falling into said hopper by gravity, means for introducing pressurized fluid into said hopper, and means for discharging the fertilizer under pressure from said hopper to the exterior of said cylinder.

References Cited in the file of this patent

UNITED STATES PATENTS

| | | |
|---|---|---|
| 1,527,128 | Durouaux et al. | Feb. 17, 1925 |
| 1,686,256 | Royle | Oct. 2, 1928 |
| 2,255,189 | Robinson et al. | Sept. 9, 1941 |
| 2,643,161 | Shirk | June 23, 1953 |
| 2,643,796 | Gustafson | June 30, 1953 |
| 2,678,238 | Schutz | May 11, 1954 |
| 2,792,030 | Wahl | May 14, 1957 |

FOREIGN PATENTS

| | | |
|---|---|---|
| 719,809 | France | Nov. 24, 1931 |